engages the end of a bale fed thereto by movement of the bale wagon relative to the bale, lifts that end and then engages the face of the bale previously contacting ground so that the bale is then in the position shown in FIG. 8.

The plate 67 pivots about its pivotal connection with the rigid link 71 as the end of the bale is lifted and is raised at the same time due to the provision of the third link 74 crossing the first link 73 this movement being accommodated by the pivotal connection between the rigid link and the bracket 73 on the frame 54. This reorientation of the plate 67 results in the chain link 75 becoming taut, and hence effective, to form the parallelogram with the rigid link 71 and whereafter the chain link 74 becomes slack and hence ineffective. It will be seen from FIG. 8 that the plate 67 is parallel to the operative run of the elevator chain 57 and the parallelogram formed by the links 71 and 75 will maintain this orientation irrespective of any variation in the thickness of the bale so that the bale is positively urged into contact with the elevator 52 by the weight of the plate 67 and the associated components and by the spring 76.

As the bale is further elevated by the elevator 52, it falls towards the inclined conveyor 55 and is eventually totally transferred to the same. As this transition takes place, the area of contact between the plate 67 and the bale gradually reduces with the result that the plate drops downwardly about the pivotal connection between the rigid link 71 and the bracket 73 and the chain link 74 again becomes taut and causes the plate 67 to tilt counterclockwise about the pivotal connection between the rigid link and the bracket 72 whereupon the chain link 75 again becomes slack. The chain link 74 causes the plate 67 to continue the counterclockwise tilting to ensure contact of the latter with the bale until the last possible moment. The illustrated bale holding means 66 are very effective in holding a bale against the elevator 52 throughout the action of the latter thereon which thus improves the action of the elevator in making it more positive so that there is little or no hesitance in the picking up of bales.

The inclined conveyor 55 comprises a chain 80 extending around spaced sprockets 77 and 78 mounted on respective shafts 79 and 81, the former shaft being supported on the subframe 54 and driven by the hydraulic motor 63 through a bevel gear arrangement 82 between the shafts 79 and 62. The shaft 81 is supported between two side members 83 of the inclined conveyor 55, the side members being rigidly connected to one end of links 84 the other ends of which are pivotally attached to the carriage frame about a shaft 85 associated with the horizontal conveyor 56. The subframe 54 is pivotally attached to the inclined conveyor 55 about the shaft 79 and pivotally attached to one end of a strut 86 the other end of which is pivotally connected to a bracket 87 extending from the carriage frame. Thus the elevator 52 is suspended from the carriage frame by a parallelogram arrangement comprising the strut 86 on the one hand and the combined side members 83 and links 84 on the other hand, whereby the orientation of the elevator remains the same relative to the ground irrespective of the position of the inclined conveyor 55 relative to the horizontal conveyor 56, which position changes according to whether the pick-up means 23 is in the operative or inoperative position, as will be explained. Pivotal movement of the inclined conveyor 55 relative to the horizontal conveyor 56 is effected by a hydraulic cylinder 88 connected between the inclined conveyor and the carriage frame. The chain 80 carries relatively aggressive bale engaging and conveying members 89 at spaced intervals therealong.

The front and rear of the inclined conveyor 55 are each fitted with a bale guide and retainer rail 91, pivotally attached at spaced points to two arms 92 in turn pivotally mounted on the respective shafts 79 and 81, the four pivot points defining the corners of a parallelogram. The right hand arm 92 as seen in FIG. 3 is extended downwardly and is pivotally attached to one end of a link 93 the other end of which is pivotally attached to the carriage frame. Thus as the inclined conveyor 55 is pivoted upwardly relative to the horizontal conveyor 56, the link 93 pulls on the extension of the right hand arm 92 partially to collapse or fold the rail 91 so that it will not foul other components when the pick-up means 23 is moved to the transport position of FIG. 3.

Turning now to the horizontal conveyor 56, this comprises a chain 94 carrying bale engaging and conveying members 95 which are less aggressive than those of the inclined conveyor 55 and are in the form of L-shaped members extending transversely of the chain such that adequate bale conveyance is effected thereby without any interference in the subsequent transfer of the bales to the first load floor 17. The chain extends around sprockets 96 and 97, the sprocket 96 being attached to the shaft 85 and the sprocket 97 to a shaft 98 supported on the carriage frame between the members 49 and 53 thereof. The horizontal conveyor 56 is driven by the hydraulic motor 63 from the inclined conveyor shaft 81 which carries a sprocket 99 (FIGS. 3, 4 and 5) drivingly connected to a sprocket 101 on the shaft 85 by a chain 102. The hydraulic motor 63 is controlled by the valve (not shown) which also controls hydraulic motors associated with the bale unloading means 26, the valve being such that if the motor 63 is energized, the bale unloading motors are de-energized and *vice versa*. Furthermore, the motor 63 is de-energized when the conveyors 27 and 28 are driven so that the drive to the elevator 52, inclined conveyor 55 and horizontal conveyor 56 is interrupted when bales are being transferred from the transfer table to the first load floor 17 or otherwise moved through the bale wagon.

The shaft 81 also carries a pulley 103 and a further pulley 104 is provided on a shaft 105 supported in brackets extending from the respective members 45 and 51 of the carriage frame and disposed to one side and below the shaft 81. A belt 106 extends around the pulleys 103 and 104. Two capstans 107 (FIGS. 4 and 6) are mounted on the shaft 105 each having a rope or cable 108 therearound to form two capstan clutches, the rope of one capstan being wound oppositely to that of the other capstan. One end of each rope 108 is attached to the subframe 32 at 109 and the other end attached to a pivotal control member 111 (FIG. 4) movement of which by the bale wagon operator tensions one or other of the ropes 108 which then clutches the associated capstan 107 whereupon the carriage, and hence entire pick-up means 23, is moved in one direction or another, as required, along the guide channels 35 and 36. This movement can only occur when the inclined conveyor 55 has been pivoted to a horizontal position by actuation of the cylinder 88 in line with the horizontal conveyor 56 as seen in FIG. 3 because it is only in this position that the drive belt 106 is tensioned between the pulleys 103 to 104 to impart drive to the shaft 105 and capstans 107. In the operative position of the pick-up

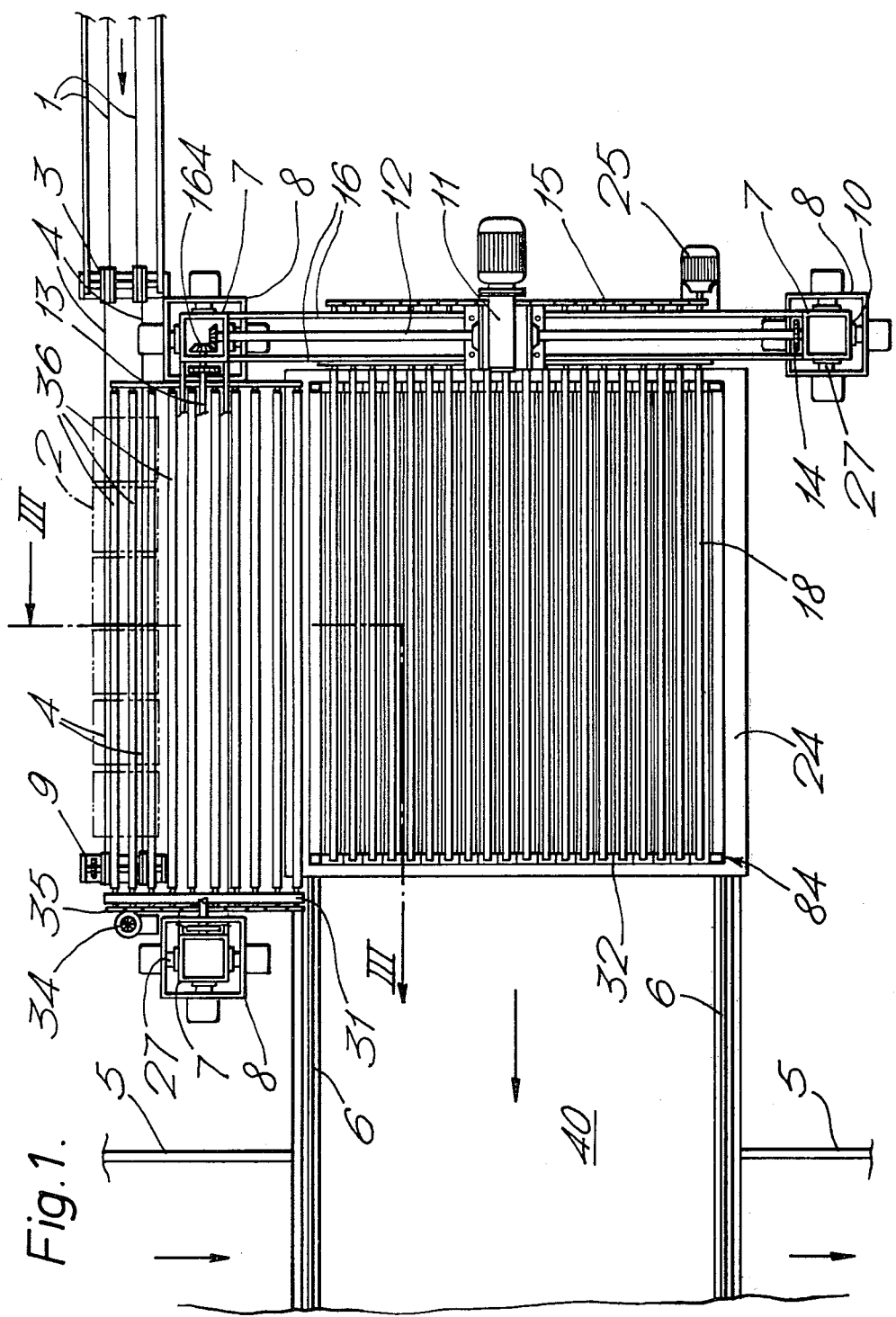

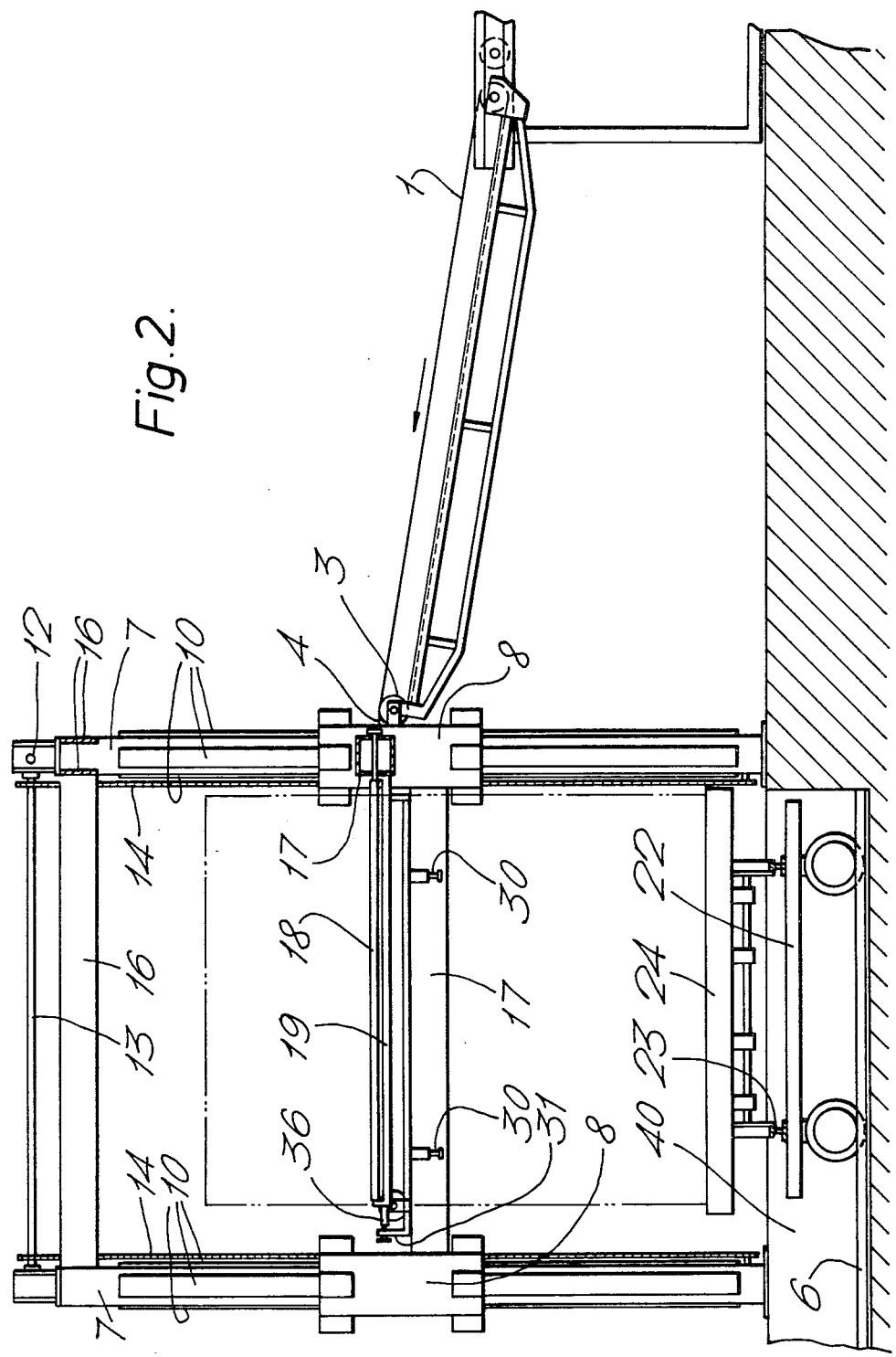

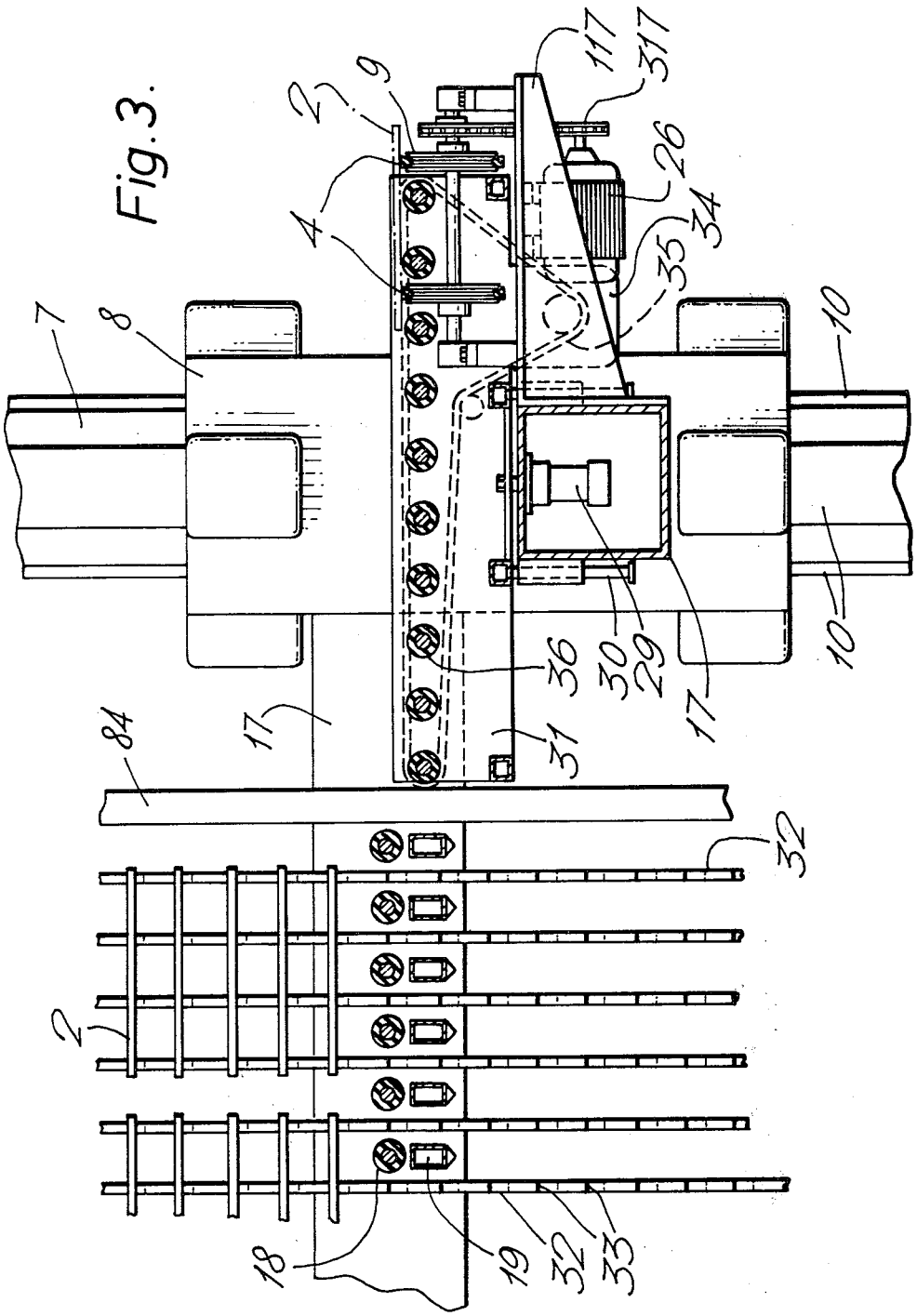

MACHINE, PARTICULARLY FOR LOADING AND UNLOADING CERAMIC MATERIAL ON TO AND FROM STAKE TRUCKS

SUMMARY OF THE INVENTION

The present invention relates to an improved machine which is particularly suitable for unloading and loading ceramic tiles of any configuration and/or size from and on to normal stake trucks.

In this respect, the excess ceramic material, especially glazed material, which is produced at certain stages in the production cycle is usually stored on stake trucks.

These latter are normally constituted by a plurality of vertically disposed grid frames, the horizontal elements of which are arranged to constitute a plurality of horizontal superposed storage shelves for receiving the ceramic tiles.

This type of stake truck is loaded and unloaded by suitable machines.

Machines are known which are constituted essentially by a vertical slide driven with straight-line reciprocating motion, which when viewed in plan is of L configuration with its dihedral designed to receive a normal stake truck which, during the loading and/or unloading stages, is served by a horizontal roller table mounted cantilevered relative to an arm of said vertical slide.

Furthermore, between said arm and roller table there is provided a loading and unloading belt conveyor, this being supported in a cantilevered manner by the second arm of said vertical slide at the same level as the roller table, and orthogonal thereto.

The outer end of this loading and unloading conveyor is hinged to a feed conveyor which swivels in a vertical plane and is also of the belt type as the preceding.

Transverse lines of tiles, suitably spaced apart, are formed by means of suitable known devices downstream of said feed conveyor.

The tiles which constitute each individual transverse line are also suitably spaced apart, and the length of said transverse lines is equal to the length dimension of the stake trucks.

Known machines of the aforesaid type have the drawbacks summarised hereinafter.

Firstly, they are excessively large, and this means that large areas inside the ceramics factories have to be made available for them.

However, this is not always possible without sacrificing other plants or lines in the production cycle, especially inside existing factories which, having already undergone conversion and improvement, have already reached saturation of their covered area.

It should be noted that the said excessive size derives from the large transverse and longitudinal dimension of the swivel-type feed conveyor of the machine.

In this respect, said large transverse dimensions derive from the need to be able to feed the said transverse lines, while the longitudinal dimensions have to be such as to prevent excessive inclination of the conveyor, which would result in sliding of the tiles on the belts, with all the drawbacks deriving therefrom.

Finally, these types of machine are excessively complicated and costly, when one thinks merely of the number of V-belts and winding and deviation pulleys necessary for forming the said loading and unloading conveyor and the swivel-type feed conveyor.

The object of the present invention is to provide an improved loading and unloading machine which although of simple and rational design of small overall size, obviates the aforesaid drawbacks.

According to the invention, the proposed improved machine is of the type comprising a vertical slide driven with reciprocating straight-line motion and of L configuration in plan view, and a horizontal roller table mounted cantilevered and orthogonal relative to one arm of said L, wherein a second roller table is provided parallel to the first and disposed at the other arm of the L, and located to the side of and below a pair of service V-belts which are supported by said other arm of the L and to which there is hinged a normal pair of swivel V-belts. Furthermore, as the result of a suitable command, said second roller table can slide vertically relative to the corresponding arm of the vertical slide, so that its upper generating lines are moved to a position either below or above the upper straight portions of said pair of service V-belts, whatever their operational position in terms of height.

The constructional merits and operational characteristics of the invention will be more apparent from the description given hereinafter with reference to the accompanying figures in which:

FIG. 1 is a plan view of the invention;

FIG. 2 is a vertical broken view of the machine taken parallel to the loading and unloading roller table;

FIG. 3 is a section on the line III—III of FIG. 1.

From the aforesaid figures, and in particular FIGS. 1 and 2 taken together, it can be seen that the machine concerned is composed of three box columns 7 disposed at a right angle when viewed in plan. The upper ends of each pair of box columns 7 are connected together by two horizontal stiffening plates 16 lying vertically.

Above the right hand pair of said stiffening plates 16 there is disposed a geared motor 11, the purpose of which is to drive a horizontal shaft 12.

An orthogonal transmission 164 is disposed at the upper end of the intermediate box column 7, and is connected to one end of said shaft 12 for the purpose of driving a second horizontal shaft 13 disposed parallel to and above the second pair of stiffening plates 16. Those ends of the shafts 12 and 13 which are distant from the said orthogonal transmission are suitably supported at the upper ends of the corresponding box columns 7. Two sprocket wheels are keyed on to the opposing ends of the shaft 13, and over them there pass two chains 14 which are returned at the base of the corresponding columns 7 by a pair of idle toothed wheels as shown in FIG. 2.

On that end of the shaft 12 which is distant from the said orthogonal transmission, there is keyed a sprocket wheel over which there passes a further chain 14, which is returned at the base of the corresponding box column 7 by means of a suitable toothed wheel.

The three box columns 7 define the runway structure for a vertical slide composed of three small carriages 8.

Each of these carriages is connected to a link of the corresponding chain 14.

These carriages 8 are each essentially constituted by a casing which embraces the corresponding box column 7, and is provided internally both upperly and lowerly with four idle rollers 27 designed to slide on rolling tracks 10 provided on the faces of the box columns 7.

Each pair of carriages 8 is connected together by means of a cross member 17.

Parallel to the pair of box columns 7 above which the geared motor 11 is disposed, there is provided a pair of rails 5 along which the normal stake trucks run.

A pit 40, on the base of which two further rails 6 are located, is provided in the factory floor orthogonal to the pair of rails 5 and to the vertical plane containing the two columns above which the geared motor 11 is disposed, as shown in FIG. 2. A transfer truck 22 runs on these two further rails, and is provided upperly with two rail portions 23 which are disposed orthogonal to the rails 6 and parallel to the pair of rails 5. The rail portions 23 are designed to receive the flanged wheels of a normal stake truck, which is composed substantially of a platform 24, a vertically extending hollow parallelepiped structure 84, and a set of grid frames 32 as shown in FIG. 3, the vertical elements or uprights of which are connected together by a plurality of horizontal members 33 which together with the members 33 of the adjacent uprights define a like number of storage shelves for the ceramic material in tile form 2.

When viewed in plan, the vertical slide heretofore defined is of L-shape, and receives said trucks in its dihedral.

With reference to FIG. 1, it can be seen that the vertical grid frames 32 which make up said stake truck are disposed parallel to the rails 6. On the outside of the cross member 17 which connects together the two box columns 7 above which the geared motor 11 lies, there is disposed an electric motor 25, on the exit shaft of which there is keyed a sprocket wheel for driving a chain 15 which extends as a horizontal loop parallel to the cross member 17.

The upper and lower straight portions of the loop of the chain 15 engage with a plurality of sprocket wheels keyed on to the free ends of a like number of spindles which are rotatably mounted relative to the cross member 17.

On the other end of each of these spindles there is keyed a roller 18 faced with a suitable soft material, which can be rubber or another equivalent elastomer, and extending practically over the entire width of the stake truck which is designed to occupy the dihedral defined by the three box columns 7.

From the inner vertical face of said cross member 17 there branch a plurality of arms 19 designed to rotatably support the projecting ends of the rollers 18.

The diameter of these latter, as clearly shown in FIG. 3, is obviously slightly less than the vertical gap between each pair of vertical grid frames 32.

Furthermore, the transverse dimension of the arms 19 is slightly less than that of the rollers 18.

In addition, the number of rollers 18 is equal to the number of vertical gaps defined by the grid frames 32 which make up the said stake truck.

A bracket 117 branches from the outer vertical face of the other cross member 17, i.e. that cross member disposed orthogonal to the rails 5 for the stake trucks, and on which a pair of service V-belts 4 is disposed parallel to said cross member 17. These V-belts pass over a pair of pulleys 9, the shaft on which they are keyed being driven by a chain 317, from a motor 26 disposed below the bracket 117.

These service V-belts 4 are returned, at the intermediate box column 7, over a pair of double-race pulleys 3, which are rotatably mounted relative to said shelf 117.

Two feed V-belts 1 pass around the second races of said pulleys 3, and their support frame is hinged to the vertical slide of the machine according to the invention.

The feed conveyor 1 is of the swivel type, and is served at its other end by the usual known devices normally used in the ceramics industry, these being designed to form groups of tiles thereon, conveniently spaced apart, their lengths corresponding to the transverse dimension of the stake trucks. The tiles 2 which form each individual group are also spaced apart.

The inner central zone of the said cross member 17 is occupied by a vertical double acting cylinder-piston unit 29, the casing of which is fixed on to the upper horizontal wall of said cross member 17.

The rod of this unit is connected to a frame 31, from the base of which branch cylindrical bars 30 which are slidably mounted in vertical guides rigid with the cross member 17.

On that vertical wall of the frame 31 which faces the rails 5 there is disposed a motor 34, on the exit shaft of which is keyed a sprocket wheel about which a chain 35 passes. This latter is deviated upperly over a plurality of sprocket wheels, the shafts on which they are keyed being rotatably mounted relative to the frame 31. Each of these shafts supports a roller 36 covered with a suitable soft material, which can be rubber or another equivalent elastomer, and supported at its free end, which is in proximity to the central box column, by the said frame 31.

As clearly shown in FIG. 3, a proportion of the rollers 36 lie between the upper straight portions of the service V-belts 4, to which said rollers 36 are disposed parallel, while the remaining proportion of the rollers 36 lies between the most inner service V-belt 4 and the corresponding side wall of the structure 84 of the stake truck.

Obviously, the last roller 36 to the left is slightly separated from said vertical wall of the parallelepiped structure 84 to prevent any interference as the stake truck moves relative to the described machine.

As is normally the case in the ceramics industry, the machine is provided with a plurality of sensors, for example in the form of photoelectric cells or microswitches, designed to operate all its component devices or units in perfect synchronism.

The machine heretofore described operates as follows.

The loading stage of the apparatus according to the invention will firstly be described.

At the beginning of said loading stage, the vertical slide of the machine is completely raised so that the upper generating lines of the wheels 18 are slightly above the horizontal elements 33 of the grid frames 32 which comprise the stake truck 24.

Each time a shelf of the truck 24 is completely loaded with tiles, the slide is lowered in order to load the lower shelf.

The trucks 24 are collected by the transfer carriage 22, which moves them to within the dihedral defined by the three box columns 7. This operation in which the stake truck is inserted into the said dihedral does not lead to any interference, in that the rollers 18 are perfectly aligned with the vertical gaps between the grid frames 32.

When loading is complete, the transfer carriage 22 returns the stake truck 24 into alignment with the rails 5, so that the stake truck 24 which has just been loaded can be moved towards the downstream zone of the rails 5, while the machine dihedral is occupied by the next empty stake truck.

As stated heretofore, groups of tiles 2 suitably spaced apart from each other are formed downstream of the feed V-belts 1.

At the beginning of operation, the service V-belts 4 and the feed belts 1 are driven by the motor 26 until the first group of tiles 2 is perfectly aligned, on the upper straight portions of the service belts 4, with the longitudinal extension of the first upper storage shelf of the stake truck 24.

During these operational stages, the frame 31 is in its lowered position, so that the upper generating lines of the rollers 36 are slightly below the level defined by the upper faces of the upper straight portions of the service belts 4.

When said alignment has taken place, the motor 26 stops the belts 4, and the cylinder-piston unit 29 receives the command for slightly raising the frame 31. This raising enables the upper generating lines of the rollers 36 to move slightly above the upper faces of the upper straight portions of the service belts 4, so that the group of tiles 2 is lifted from this latter.

Almost instantaneously, the motor 34 is made to drive the chain 35, so that the rollers 36 rotate, with reference to FIG. 3, in the left hand direction, so as to transfer the group of tiles 2 beyond the service belts 4.

The movement of the group of tiles 2 by the roller table 36 can continue until this group has reached the initial part of the roller table 18 which is also in movement, and which stops as soon as the group has passed beyond the vertical wall of the structure 84 which separates the two roller tables. After this, the motor 34 stops, the vertical cylinder-piston unit 29 lowers the frame 31, and the motor 26 again drives the conveyor 4. This latter stops as soon as the second group of tiles 2 is completely supported by the service belts 4 and is aligned with the longitudinal extension of the stake truck 24. The frame 31 is then again raised by the unit 29, and the rollers 36 transfer the second group of tiles 2 on to the roller table 18 which moves the previously loaded group of tiles 2 through one step.

The operational stages as heretofore described proceed until the upper storage shelf of the stake truck is completely filled with groups of tiles 2.

At this point, the first group of tiles loaded on to the upper storage shelf of the stake truck 24 comes into contact with a suitable sensor, which controls the geared motor 11 so that it lowers the machine slide through one step.

This lowering obviously moves the upper generating lines of the roller table 18 slightly above the level occupied by the horizontal elements 33 which constitute the penultimate storage shelf of the stake truck 24. On termination of this lowering movement, the penultimate storage shelf is filled in the manner heretofore described, after which the vertical slide is lowered through a further step.

This procedure continues as heretofore described until the lower storage shelf of the stake truck 24 has been completely filled.

On termination of these loading stages, the stake truck 24 is extracted from the machine and is replaced by an empty stake truck.

In the meantime, the vertical slide of the machine is returned to its own upper limit by the geared motor 11, which is of the self-braking type.

At this point it will have been noted that during the loading stages, the vertical slide of the machine moves stepwise when it is in the descending stage, whereas it moves continuously when in the ascending stage.

For unloading the stake truck 24 which has already been filled with ceramic material, the said movement procedure for the vertical slide of the machine is reversed, i.e. it moves stepwise during the ascending or unloading stage, whereas it moves continuously during the descending or repositioning stage.

It should be noted that all other units or devices which comprise the machine also operate in the reverse manner during unloading, and for this purpose the machine is provided with drives which allow this.

Finally, it will have been noted that in order to reduce the overall size of the machine heretofore described, the bracket 117 and the elements connected to it can be housed inside the two corresponding box columns 7, so that the transverse extension of the roller table 36 is also reduced.

What is claimed is:

1. Ceramic material loading and unloading apparatus for loading and unloading a plurality of lines of ceramic material articles onto and from stake trucks having horizontal support rails, said apparatus comprising, a flat horizontal roller table composed of a plurality of spaced apart coplanar rollers, means supporting said rollers of said table for simultaneous movement vertically, motor means for rotating said rollers to feed a line of ceramic articles transversely across said table, means for feeding lines of aligned ceramic material articles onto said first table, comprising, a second horizontal roller table beside and generally coplanar with said first table and composed of a plurality of spaced apart rollers parallel to the rollers of the first table, motor means for rotating said rollers of said second table to advance a line of ceramic material articles transversely to said first table, the rollers of said second table having an effective length essentially the same as the rollers of the first table, means supporting the rollers of said second table for simultaneous vertical movement with the rollers of the first table, feed means for feeding a line of ceramic articles onto said second table, said feed means comprising, a pair of spaced apart V-belts parallel with the rollers of said second table, means for supporting said V-belts, means for moving said second table and said support means for said V-belts vertically relative to each other between a first position in which an uppermost surface of the V-belts is above the rollers and ceramic articles can be conveyed on the V-belts to a position above the rollers, and a second position in which the uppermost surface of the V-belts is below the uppermost surface of the rollers to deposit the ceramic articles onto the rollers of the second table, motor means for driving said V-belts to convey a line of ceramic articles to a position above the rollers of the second table, means for feeding a line of ceramic articles to said V-belts and comprising, a conveyor having an end pivotally connected to the support means for the V-belts and generally aligned with the V-belts, and means for driving said conveyor to feed ceramic articles one by one to said V-belts.

2. Ceramic material loading and unloading apparatus according to claim 1 wherein each of said motor means comprises reversible motor means for unloading ceramic articles from the stake trucks.

3. Ceramic material loading and unloading apparatus according to claim 1 wherein said V-belts comprise means for feeding only a single line of ceramic articles, and said conveyor means comprises means for feeding only a single line of ceramic articles.

4. Ceramic material loading and unloading apparatus according to claim 3 wherein said conveyor means comprises a pair of V-belts.

5. Ceramic material loading and unloading apparatus according to claim 1 wherein, each roller of said second table comprises a soft material facing.

6. Ceramic material loading and unloading apparatus according to claim 1 wherein the apparatus comprises an L-shaped frame as viewed in plan, three vertical support columns, and means mounting said frame for step by step vertical movement on said columns, said frame supporting said first roller table, said second roller table, said V-belts, and said end of said conveyor.

* * * * *